US010410208B2

(12) United States Patent
Douglas et al.

(10) Patent No.: US 10,410,208 B2
(45) Date of Patent: Sep. 10, 2019

(54) TOKEN IDENTITY DEVICES (71) Applicant: CAPITAL ONE SERVICES, LLC, McLean, VA (US)

(72) Inventors: Lawrence Douglas, Mclean, VA (US); Paul Moreton, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 729 days.

(21) Appl. No.: 15/136,492

(22) Filed: Apr. 22, 2016

(65) Prior Publication Data

US 2016/0314458 A1    Oct. 27, 2016

Related U.S. Application Data (60) Provisional application No. 62/152,447, filed on Apr. 24, 2015.

(51) Int. Cl.
*G06K 19/06* (2006.01)
*G06Q 20/36* (2012.01)
*G06Q 50/26* (2012.01)

(52) U.S. Cl.
CPC ....... *G06Q 20/363* (2013.01); *G06Q 20/3674* (2013.01); *G06Q 50/265* (2013.01)

(58) Field of Classification Search
CPC . G06Q 20/363; G06Q 20/3674; G06Q 50/265
USPC ........................................................ 235/492
See application file for complete search history.

(56) References Cited

U.S. PATENT DOCUMENTS

| | | | | |
|---|---|---|---|---|
| 2016/0071094 | A1* | 3/2016 | Krishnaiah | G06Q 20/363 705/66 |
| 2016/0314456 | A1* | 10/2016 | Douglas | G06Q 20/3278 |
| 2016/0314458 | A1* | 10/2016 | Douglas | G06Q 20/363 |
| 2016/0328707 | A1* | 11/2016 | Wagner | G06Q 20/38215 |
| 2017/0017957 | A1* | 1/2017 | Radu | G06Q 20/3829 |
| 2017/0063840 | A1* | 3/2017 | Krishnaiah | H04L 63/0815 |
| 2017/0373852 | A1* | 12/2017 | Cassin | G06Q 20/12 |
| 2018/0108008 | A1* | 4/2018 | Chumbley | G06Q 20/3674 |
| 2018/0137499 | A1* | 5/2018 | Douglas | G06Q 20/3278 |

* cited by examiner

Primary Examiner — Thien M Le
(74) Attorney, Agent, or Firm — Finnegan, Henderson, Farabow, Garrett & Dunner, LLP (57) ABSTRACT Disclosed embodiments include methods, systems, and computer-readable media configured to provide wearable devices storing tokens associated with digital versions of physical documents/cards. The wearable devices may further transfer tokens securely to interested parties without Bluetooth® or other network connectivity beyond NFC radio. In some embodiments, a token vault operator system may receive a request to establish a token vault account for a user, authenticate an identity of the user based at least on the received request, and generating a token vault ID associated with the user. The token vault operator system may further configure access to data sets generated for and associated with the token vault ID, generate tokens associated with the token vault ID, each token corresponding to one of the one or more data sets, and provide the generated plurality of tokens associated with the token vault ID to at least one user device.

20 Claims, 9 Drawing Sheets

TOKEN IDENTITY DEVICES

PRIORITY

This application claims priority to U.S. Provisional Application No. 62/152,447 filed Apr. 24, 2015, the disclosure of which is hereby incorporated by reference in its entirety.

BACKGROUND

Currently, individuals typically carry physical documents or cards to identify themselves and/or their accounts, profiles, etc. For example, people seeking medical care or wishing to make an insurance claim must typically present a physical government issued identification (ID) (driver's license, social security card, etc.) and/or an insurance card in order to obtain access to their medical records and initiate the process. Similarly, those wishing to make a financial transfer must typically present identification along with a financial card.

Physical documents and cards, however, may be forged and are therefore susceptible to fraud from fairly unsophisticated criminals. Physical documents and cards also require individuals to carry wallets and/or purses to store the physical documents and cards. Moreover, the ability to deactivate and/or reissue physical documents and cards is often limited, resulting in a time consuming process that allows criminals to continue the fraudulent use of compromised physical documents and cards.

Thus, certain aspects of the disclosed embodiments provide methods and systems for digitizing a wallet using, in some embodiments, wearable devices storing tokens associated with digital versions of physical documents/cards and that are capable of securely transferring those tokens to interested parties without Bluetooth® or other network connectivity beyond near field communication (NFC) radio. Other aspects are also provided as disclosed below.

SUMMARY

Disclosed embodiments include methods, systems, and computer-readable media configured to, for example, provide wearable devices storing tokens associated with digital versions of physical documents/cards that are capable of securely transferring those tokens to interested parties without Bluetooth® or other network connectivity beyond NFC radio.

In one aspect, the disclosed embodiments include a system comprising a database configured to store a plurality of tokens, each token of the plurality of tokens associated with one or more token vault IDs. The system may also comprise at least one network communication device, a storage device comprising instructions, and at least one processor configured to execute the instructions to perform a method. The method may, for example, comprise receiving a request to establish a token vault account for a user, the request comprising at least one of customer identification information, financial account information, medical history information, and an access credential to an external data set. The method may also include authenticating an identity of the user based at least on the received request and generating a token vault ID associated with the user. The method may further comprise configuring access of the system to one or more data sets generated for and associated with the token vault ID, the one or more data sets being stored in the database or at least one external storage database. The method may also include generating a plurality of tokens associated with the token vault ID, each token of the plurality of tokens associated with the token vault ID corresponding to one of the data sets. The method may also include providing the generated plurality of tokens associated with the token vault ID to at least one user device.

Aspects of the disclosed embodiments may include tangible computer-readable media that store software instructions that, when executed by one or more processors, are configured to and capable of performing and executing one or more of the methods, operations, or the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
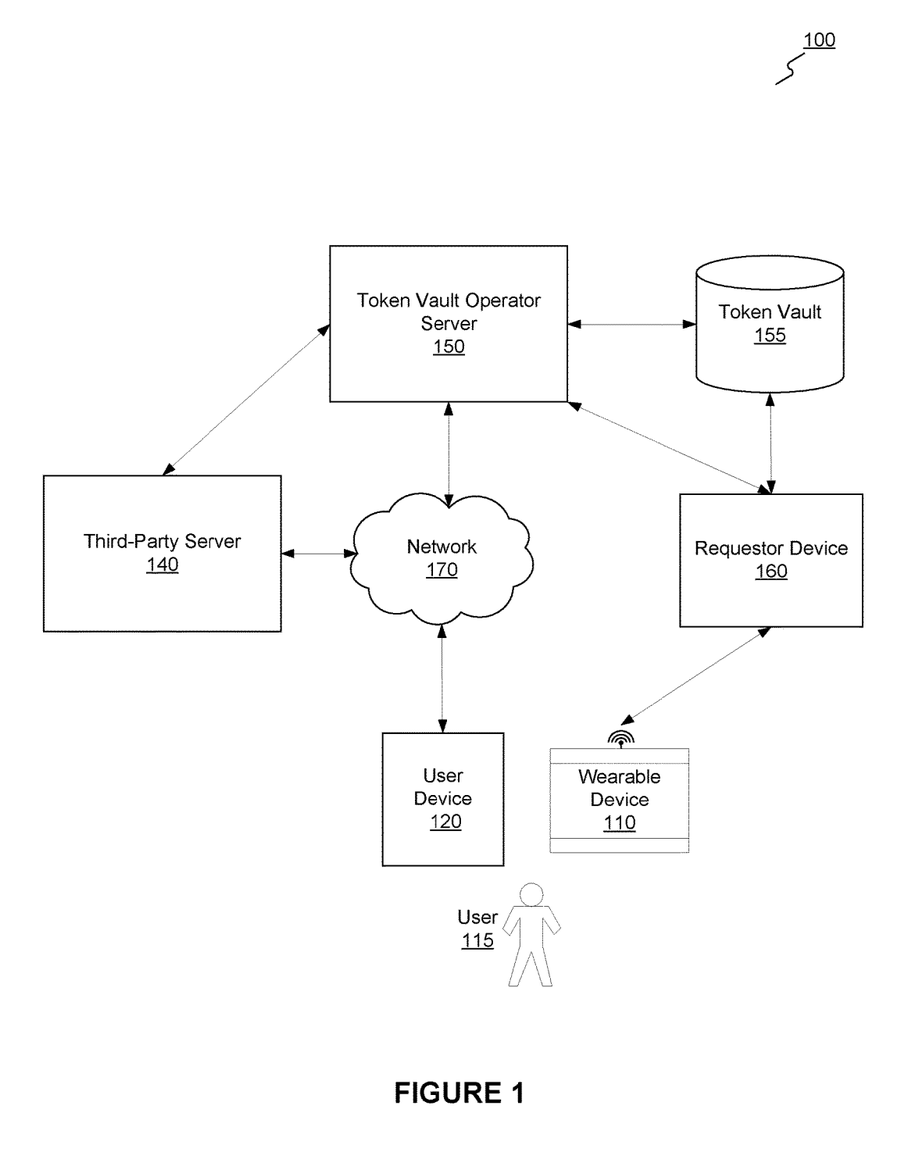
FIG. 1 is a block diagram of an exemplary system, consistent with disclosed embodiments.

FIG. 1 is a block diagram of an exemplary system 100 for performing one or more operations, consistent with the disclosed embodiments. In one embodiment, system 100 may include one or more wearable devices 110, one or more user devices 120, one or more third-party servers 140, one or more token vault operator servers 150, one or more token vaults 155, one or more requestor devices 160, and/or network 170. Consistent with disclosed embodiments, user 115 may be associated with user device 120 and/or wearable device 110. The components and arrangement of the components included in system 100 may vary. Thus, system 100 may include other components that perform or assist in the performance of one or more processes consistent with the disclosed embodiments.

Components of system 100 may be computing systems configured to provide methods and systems that enable the use of wearable devices storing tokens (e.g., a secure software mechanism that may be used to authorize or identify) associated with digital versions of physical documents/cards and capable of securely transferring those tokens to interested parties without Bluetooth® or other network connectivity beyond NFC radio, consistent with disclosed embodiments. As further described herein, components of system 100 may include one or more computing devices (e.g., computer(s), server(s), etc.), memory storing data and/or software instructions (e.g., database(s), memory device(s), etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with wearable device 110, user device 120, third-party server 140, token vault operator server 150, token vault 155, or requestor device 160.

Wearable device 110 may be one or more wearable computing devices configured to communicate with other components of systems 100 to perform one or more processes consistent with disclosed embodiments. For example, wearable device 110 may include memory devices configured to store information (e.g., one or more tokens) that may be transmitted to a point of sale (POS) device at a merchant for use in processing a transaction and/or identifying a loyalty account, transmitted to a computer at a doctor's office for use in identifying medical records, transmitted to a government entity or any other entity requesting identification or other non-personal information, etc.

Figure 2:
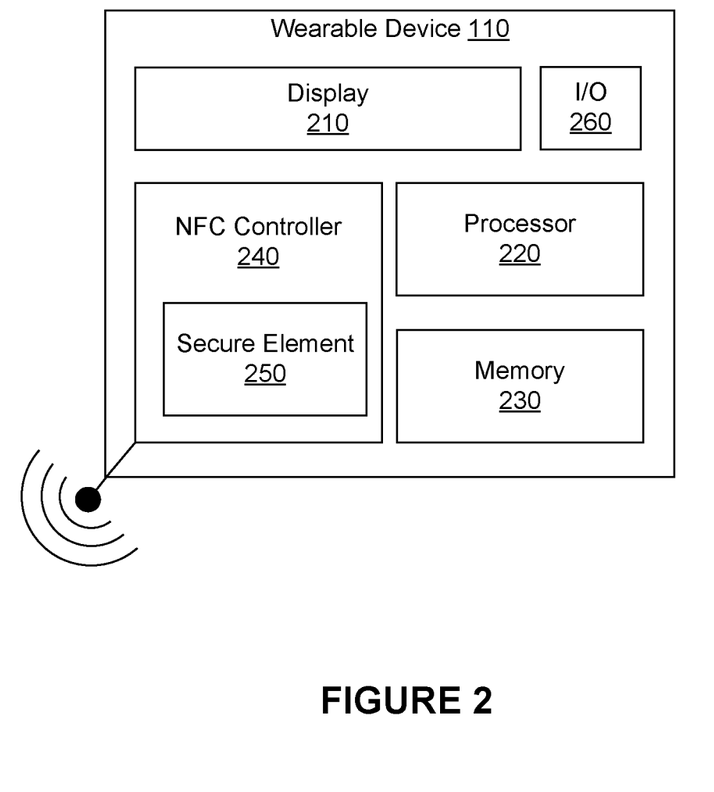
FIG. 2 is a diagram of an exemplary wearable device configuration, consistent with disclosed embodiments.

FIG. 2 depicts an exemplary wearable device 110, consistent with disclosed embodiments. In one embodiment, wearable device 110 may include components that may execute one or more processes to securely transfer tokens associated with digital versions of physical documents/cards to interested parties without Bluetooth® or other network connectivity beyond NFC radio. As shown in FIG. 2, wearable device 110 may include a display 210, processor 220, a memory device 230, an NFC controller 240 comprising at least a secure element 250, and/or an input/output (I/O) devices 260.

Display 210 may be a device component configured to convey information to a user, such as user 115. For example, display 210 may be a screen display, one or more LED light(s), etc. In some embodiments, display 210 may be configured to optically display a token/token slot selected for transmission to an interested party or other information to the user (e.g., user 115).

Processor 220 may include one or more known processing devices, from microcontrollers configured to process simple logic commands, such as PIC microcontrollers, MIPS microcontrollers, etc., to more powerful microprocessors including the Pentium™ or Xeon™ family manufactured by Intel™, the Turion™ family manufactured by AMD™, or any of various processors manufactured by Sun Microsystems. The disclosed embodiments are not limited to any type of processor(s) configured in wearable device 110.

Memory device 230 may include one or more storage devices configured to store information. For example, in some embodiments, memory device 230 may store instructions that may be executed by a processor, such as processor 220. Memory device 230 may store data that may reflect any type of information in any format that the system may use to perform operations consistent with the disclosed embodiments.

In some embodiments, processor 220 may execute one or more programs stored by memory device 230. For example, processor 220 may execute a transaction program configured to securely transfer those tokens to interested parties without Bluetooth® or other network connectivity beyond NFC radio. More specifically, processor 220 may execute a transaction program configured to provide a token stored in secure element 250 to a merchant device (e.g., a POS device) when user 115 operates wearable device 110 to complete a financial transaction, provide a token to a computer at a doctor's office for use in identifying medical records, provide a token to a government entity or any other entity requesting identification or other personal information, etc.

NFC controller 240 may be a device with logic that is configured to execute NFC-related operations. Alternatively, NFC controller 240 may be software that is stored in memory 230, or a separate memory device in wearable device 110 (e.g., secure element 250). NFC controller 240 may operate and be configured according to architectures and designs known to one of ordinary skill in the art. In one embodiment, NFC controller 240 includes a secure element 250 providing an environment in which processes and data may be securely stored and/or executed. In other embodiments, secure element 250 may be separate from NFC controller 240, such as a separate embedded device in wearable device 110, such as a SIM/UICC card that functions as the secure element, or software located in memory 230 that may or may not be the same memory that hosts NFC controller 240. For example, secure element 250 may provide delimited memory for applications operating according to disclosed embodiments. In certain embodiments, secure element 250 may be configured and operate as known secure elements for NFC devices. For example secure element 250 may store applications, slot information, credentials (e.g., tokens), and/or other information associated with secure execution of applications.

Figure 3:
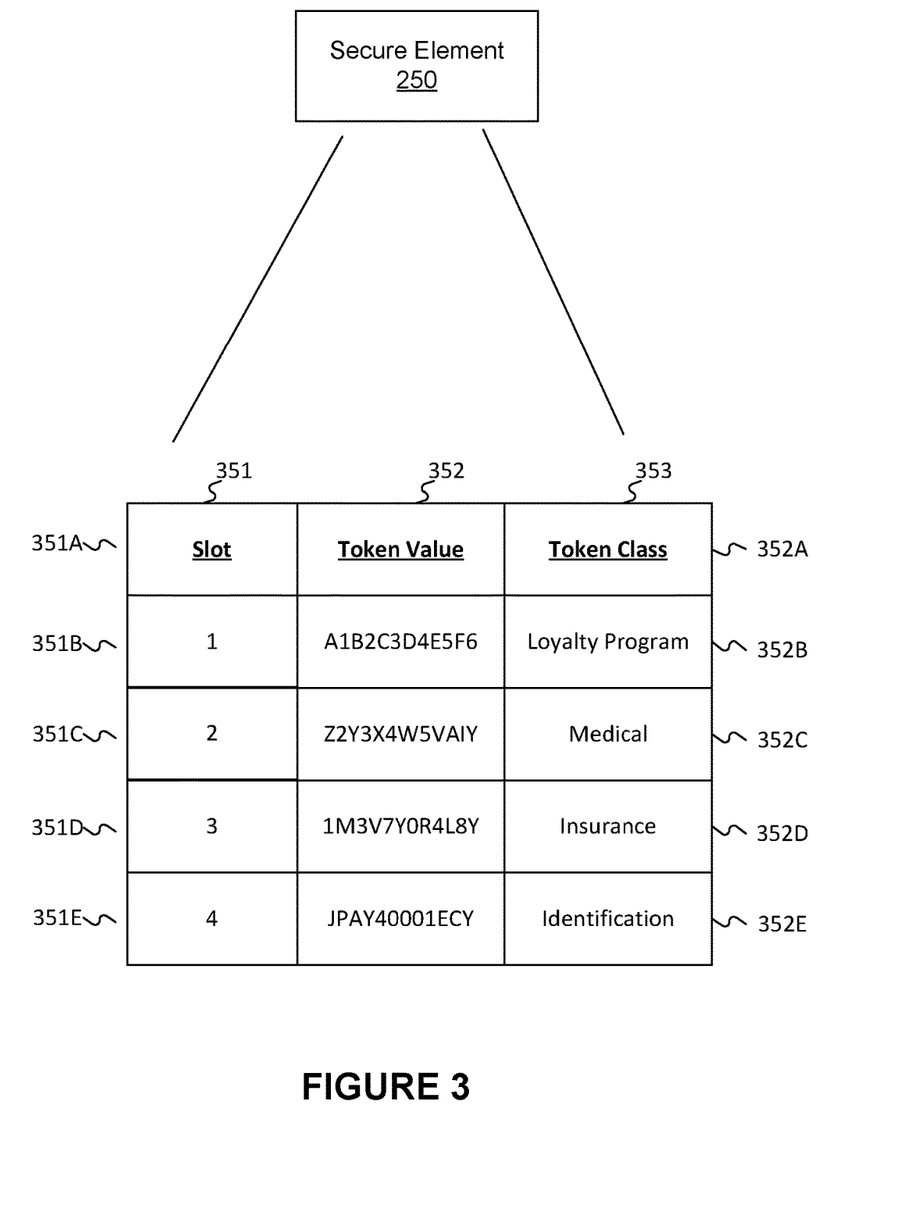
FIG. 3 is a diagram of exemplary data structure for storing data in memory of a wearable device, consistent with disclosed embodiments.

For example, as shown in FIG. 3, secure element 250 may comprise memory storing one or more token slots (fields 351), token values (fields 352), and token classes (fields 353). For example, secure element 250 may comprise four slots 351B-E corresponding to four token values 352B-E. According to some embodiments, each token value 352B-E may correspond to a different set of information, such as a financial account, medical records, generic personal information, insurance, loyalty program account, etc. of user 115. As discussed in more detail below, upon communicating with requestor device 160, wearable device 110 may identify a slot 351B-E and transmit a corresponding token 352B-E to requestor device 160 that the underlying entity (e.g., a merchant, bank, grocery store, doctor's office, etc.) may use to obtain information associated with the token in token vault 115. In some embodiments, wearable device 110 may be preprogrammed with an active slot to use when communicating with different types of requestors or request types (e.g., merchants, medical facilities seeking medical and/or insurance information, utility company requesting identification, etc.). In other embodiments, wearable device 110 may identify a slot 351 dynamically based on, for example, a rotating basis, a command from another system 100 component (e.g., third-party server 140, token vault operator server 150, etc.).

Returning to FIG. 1, I/O devices 260 may also include one or more digital and/or analog devices that allow user 115 to interact with wearable device 110, such as a touch-sensitive area, buttons, or microphones. I/O devices 260 may also include one or more accelerometers to detect the orientation and inertia of wearable device 110. I/O devices 260 may also include other components known in the art for interacting with user 115, such as optical, magnetic, vibration, or other sensors capable of detecting interaction with wearable device 110 by user 115.

In some embodiments, wearable device 110 may be a passive device having no internal power supply. For example, wearable device 110 may draw power to operate from, for example, an NFC reader associated with requestor device 160. In other embodiments, wearable device 110 may be a semi-passive device having an internal power supply for operating circuitry of wearable device 110 but drawing power from, for example, an NFC reader associated with requestor device 160 in order to communicate. In still other embodiments, wearable device 110 may be an active device having an internal power supply capable of operating all aspects of wearable device 110.

Wearable device 110 may be any device configured to be worn or carried by a user, such as a user 115. For example, wearable device 110 may be incorporated into a wearable item such as a wristband, jewelry, eyeglasses, sunglasses, watch, piece of clothing (e.g., shirt, shoe, pants, jacket, etc.), etc., may include an attachment device (e.g., a clip) to allow it to be attached to a wearable item (e.g., belt), may be incorporated into an item that is normally carried by a user or held in the user's pocket (e.g., smartphone, wallet, keys), and the like. In some embodiments, wearable device 110 may be a component of or incorporated into a commercially available wearable computing device, such as Google Glass®, a smartwatch, etc.

Returning to FIG. 1, user device 120 may be one or more computing devices configured to perform one or more operations consistent with disclosed embodiments. User device 120 may be a desktop computer, a laptop, a server, a mobile device (e.g., tablet, smart phone, etc.), or any other type of computing device. For exemplary purposes, aspects of the disclosed embodiments are described with reference to user device 120 as a mobile client device, such as a smart phone, tablet, or the like. As mentioned herein, however, the disclosed embodiments are not limited to such examples. For example, user device 120 may be a laptop, a desktop, or any other device.

User device 120 may include one or more processors configured to execute software instructions stored in memory, such as memory included in user device 120. User device 120 may include software that when executed by a processor performs known Internet-related communication, content display processes, and/or disclosed token vault processes for a user of user device 120. For instance, user device 120 may execute browser or related mobile display software that generates and displays interfaces including content on a display device included in, or in communication with, user device 120. User device 120 may be a mobile device that executes mobile device applications and/or mobile device communication software that allows user device 120 to communicate with components over network 170, and generates and displays content in interfaces via a display device included in user device 120. The disclosed embodiments are not limited to any particular configuration of user device 120. For instance, user device 120 may be a mobile device that stores and executes mobile applications that provide token vault functions offered by token vault operator server 150 and/or financial service-related functions.

Third-party server 140 may be associated with any entity capable of requesting or providing information to token vault operator server 150 and/or token vault 155. For example, third-party server 140 may be associated with a financial service provider (not shown) that provides, maintains, manages, or otherwise offers financial services. For example, financial service provider may be a bank, credit card issuer, or any other type of financial service entity that generates, provides, manages, and/or maintains financial service accounts for one or more cardholders. Financial service accounts may include, for example, credit card accounts, loan accounts, checking accounts, savings accounts, reward or loyalty program accounts, and/or any other type of financial service account known to those skilled in the art. Financial service provider may include infrastructure and components that are configured to generate and/or provide financial service accounts such as credit card accounts, checking accounts, debit card accounts, loyalty or reward programs, lines of credit, or the like.

In another example, third-party server 140 may be associated with a merchant (not shown) that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities) may purchase, consume, use, etc. In one example, a merchant may be associated with a merchant brick and mortar location that a user (e.g., user 115) may physically visit to purchase a product or service. The merchant may also include back- and/or front-end computing components that store data and execute software instructions to perform operations consistent with disclosed embodiments, such as computers that are operated by employees of the merchant (e.g., back office systems, etc.).

In still other examples, third-party server 140 may be associated with an entity that manufactures, sells, promotes, or otherwise provides wearable devices (not shown), such as wearable devices 110. In some embodiments, the issuer of wearable devices 110 may communicate with token vault operator server 150 in order to, for example, associate one or more financial accounts of user 115 in token vault 155 with one or more tokens stored in secure element 250 of wearable device 110.

In other examples, third-party server 140 may be associated with a medical practice that provides healthcare. For example, third-party server 140 may be associated with a doctor's office, emergency room, etc., that may request insurance information and/or the medical history associated with user 115. In some embodiments, as further described below, third-party server 140 may further upload updated medical history information, insurance transaction information, etc., following user 115's visit for medical care or the like.

In other examples, third-party server 140 may be associated with an entity requiring identity information to, for example, confirm user 115's identify, populate forms, etc. For example, the entity may be a government entity, employer, airport or other travel center, mortgage company, educational establishment, etc.

Third-party server 140 may be one or more computing devices configured to perform one or more operations consistent with disclosed embodiments. In one aspect, third-party server 140 may be a desktop computer, a server, or any other type of computing device. Third-party server 140 may include one or more processors configured to execute software instructions stored in memory. The one or more processors may be configured to execute software instructions that when executed by a processor performs known Internet-related communication processes.

For example, third-party server 140 may be configured to execute stored software instructions to perform operations associated with a merchant, including one or more processes associated with processing purchase transactions, generating transaction data, generating product data (e.g., SKU data) relating to purchase transactions, etc. The disclosed embodiments are not limited to any particular configuration of third-party server 140. As one example, third-party server 140 may be a point-of-sale system like a cash register. Third-party server 140 may comprise functionality and/or hardware operable to receive wireless communications from wearable device 110 and/or user device 120. For example, third-party server 140 may be configured to utilize technologies such as NFC radio, radio-frequency identification (RFID), infrared, electric field, magnetic fields, or other technologies, in order to initiate and/or process a purchase or other transaction.

Requestor device 160 may be any third-party server 140 may be configured, when communicating with token vault operator server 150 and/or token vault 155, to request information associated with a token received from wearable device 110.

For example, in some embodiments, requestor device 160 may be associated with a merchant and include a contactless payment terminal (not shown) comprising any known NFC device designed to communicate (directly or indirectly) with other components of system 100. For example, the contactless payment terminal (CPT) may be a POS terminal, automated teller machine (ATM), or any other device that is configured to communicate with NFC mobile devices (e.g., wearable device 110 and/or user device 120) to facilitate a financial transaction according to disclosed embodiments. For example, requestor device 160 may generate and send token authorization requests to token vault operator server 150 and/or token vault 155. For example, merchant device 160 may receive a token from wearable device 110 as part of a payment transaction for services and/or goods rendered, and merchant device 160 may send the token (along with other information) to token vault operator server 150 and/or token vault 155 requesting financial account information associated with the token with which to complete a payment transaction.

In another example, in some embodiments, requestor device 160 may be associated with a doctor's office and comprise any known NFC device designed to communicate (directly or indirectly) with other components of system 100. The requestor device 160 associated with the doctor's office may communicate with NFC mobile devices (e.g., wearable device 110 and/or user device 210) to facilitate the exchange of a token(s) associated with a patient's (e.g., user 115's) medical history or insurance policies. Persons of skill in the art will understand that other configurations of requestor device 160 are possible, and that the entity associated with requestor device 160 is not limited to any particular business industry.

Token vault operator server 150 may execute software that provides data used for generating and displaying interfaces, including content on a display device included in, or connected to, user device 120 or a terminal associated with a requestor device 160 (e.g., a POS associated with a merchant device). In some embodiments, token vault operator server 150 may provide one or more web sites, online portals, application programming interfaces (APIs), etc., that are accessible by user device 120, third-party server 140, and/or requestor device 160 over network 170. The disclosed embodiments are not limited to any particular configuration of token vault operator server 150.

Token vault(s) 155 may include one or more memory devices that store information and are accessed and/or managed through token vault operator server 150. By way of example, token vault(s) 155 may include Oracle™ databases, Sybase™ databases, or other relational databases or non-relational databases, such as Hadoop sequence files, HBase, or Cassandra. The databases or other files may include, for example, data and information related to generated token(s), token relationships to financial accounts of user(s) 155, financial records, purchase transaction data, etc. Systems and methods of disclosed embodiments, however, are not limited to separate databases.

In one aspect, token vault operator server 150 may include token vault(s) 155. Alternatively, token vault(s) 155 may be located remotely from the token vault operator server 150. Token vault(s) 155 may include computing components (e.g., database management system, database server, etc.) configured to receive and process requests for data stored in memory devices of token vault(s) 155 and to provide data from token vault(s) 155.

Token vault operator server 150 may be one or more devices associated with an entity (not shown) that monitors and/or controls access to token vault 155. For example, token vault operator server 150 may be operated by VISA®, MasterCard®, or any other entity controlling a payment rail capable of facilitating a transaction from the financial account of user 115 to a merchant associated with, for example, requestor device 160. In other embodiments, token vault operator server 150 may be one or more devices associated with the issuer of wearable device(s) 110, a financial service provider, etc.

Figure 4:
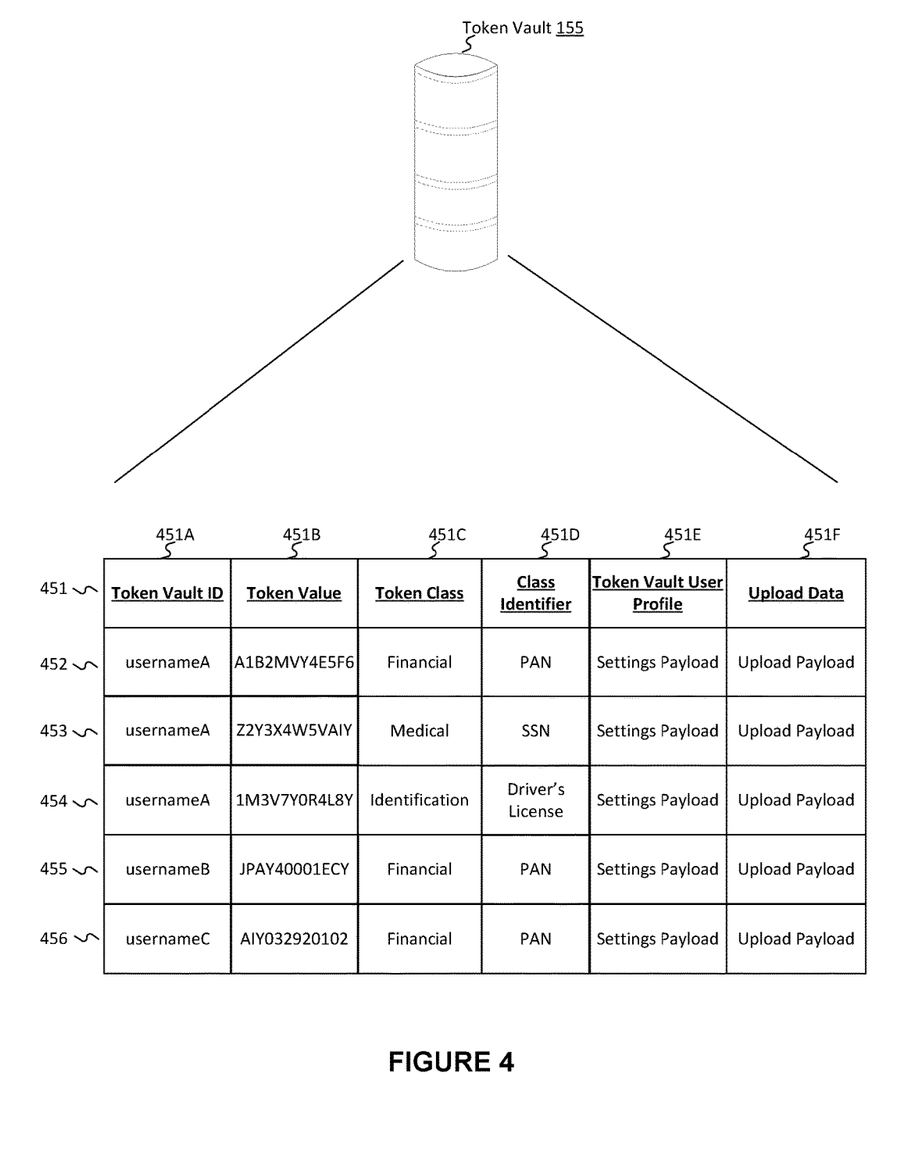
FIG. 4 is a diagram of exemplary data structure for storing data in token vault, consistent with disclosed embodiments.

FIG. 4 is a diagram of exemplary information stored in token vault(s) 155, consistent with disclosed embodiments. In one aspect, token vault(s) 155 stores one or more tables that contain records 452-456. Each of records 452-456 contain one or more fields 401 (e.g., 451A, 451B, 451C, 451D, 451E, and 451F). The fields, records, and values therein in FIG. 4 are exemplary and are provided to illustrate embodiments of the disclosure.

For example, each record may contain field 451A, entitled for exemplary purposes as "Token Vault ID." Field 451A may contain a unique identifier for a user of the token vault (e.g., user 115). Token Vault IDs may be generated, for example, by token vault operator server 150, and/or other components of system 100, upon a user 115 configuring an account for identity tokens to associate with wearable device 110 (e.g., identity token configuration process 600, discussed below). For example, user 115 may operate user device 120 to configure a token vault account, and token vault operator server 150 may generate a token vault ID in response, which may be inserted into token vault(s) 155 as an entry under field 451A.

Each record may contain field 451B, entitled for exemplary purposes as "Token Value." Field 451B may contain a unique token value. Token values may be generated, for example, by token vault operator server 150, or other components of system 100. For example, token vault operator server 150 may generate one or more token values based on data sets established during the configuration process (e.g., identity token configuration process 600), which may be inserted into token vault(s) 155 as an entry under field 451B.

Each record may also contain field 451C, entitled for exemplary purposes as "Token Class." Field 451C may contain an indication as to the type of information associated with a generated token. For example, a token class may be created for financial accounts, medical information, personal information, loyalty programs, or any other type of information a user may wish to have collected together. Thus, in some embodiments, token vault operator server 150 may identify one or more token classes for a given data set which may be inserted into token vault(s) 155 as an entry under field 451C.

Each record may also contain field 451D, entitled for exemplary purposes as "Class Identifier." Field 451D may contain one or more identifiers for a given token. For example, for a "financial" token class, the class identifier may be a primary account number (PAN) such as a credit card number, checking account/debit card number, etc. For an "insurance" token class, the class identifier may be a membership number assigned by the insurance number. For an "identification" class, the class identifier may be a social security number, tax ID number, driver's license number, etc. For a "medical" class, the class identifier may be a patient ID, social security number, or other type of unique identifier used in the medical field. Other class identifiers are possible as well.

Each record may also contain field 451E, entitled for exemplary purposes as "Token Vault User Profile." Field 451E may contain data associated with account settings of user 115. For example, during configuration (e.g., identity token configuration process 600, discussed in detail below), token vault operator server 150 may receive user preferences associated with token use. For example, consistent with disclosed embodiments, the user profile may include user preferences indicating what account information from among a plurality of accounts to return to a requestor under a variety of predefined circumstances. For example, multiple financial accounts may be associated with a token, and user profile 451E may instruct token vault operator server 150 to return a first financial account for purchases made for a first merchant, a second financial account for transactions exceeding a predetermined amount, etc. Moreover, user profile 451E may indicate that token vault operator server 150 should return the account number associated with the financial account that would provide a purchase discount, maximize rewards associated with a loyalty program, etc. In other embodiments, when each financial account is associated with a separate token, token vault operator server 150 may request the token value associated with the preferred account according to user preferences when presented with a request for a financial account number. User profile 451E may further indicate that token vault operator server 150 should prompt requestor device 160 (e.g., a POS terminal) to request a personal identification number (PIN), biometrics, etc., for transactions outside or the user's typical purchasing history (e.g., a purchase with a new merchant, a purchase with an uncharacteristically high transaction amount, etc.). User profile 451E may further include preferences regarding what information may be shared with requestors. For example, user profile 451E may indicate that only the user's name and secondary email account may be shared with marketers requesting user token information. In other embodiments, user profile 451E may indicate one or more access levels for a given requestor or group of requestors. User profile 451E may further require that token vault operator server 150 only respond to requests by certified requestors (e.g., requestors of token information that have pre-registered and/or become certified by token vault operator server 150). The above examples are intended to be exemplary only, and a person of ordinary skill in the art will understand that other user preferences are possible.

Each record may also contain field 451F, entitled for exemplary purposes as "Upload Data." Field 451F may contain information provided by user 115 via user device 120, third-party server, requestor device 160, and/or token vault operator 150. For example, consistent with disclosed embodiments, upload data 415F may include the medical history of user 115. In other embodiments, upload data 451F may include user 115's purchase history. In still other embodiments, upload data 451F may include information concerning a user 115 loyalty account with merchant.

One of ordinary skill will understand that token vault 155 may contain other fields and/or additional types of data. For example, token vault 155 may contain information such as security codes (e.g., CVV, CVV2) associated with account numbers 451D, may contain expiration dates associated with account numbers 451D, may contain names on payment cards associated with account numbers 451D, etc. Moreover, while FIG. 1 depicts a single token vault 155, one of ordinary skill will understand that a plurality of token vaults 155 may be employed operated by the same and/or different components of system 100 may be possible.

Network 170 may be any type of network configured to provide communications between components of system 100. For example, network 170 may be any type of network (including infrastructure) that provides communications, exchanges information, and/or facilitates the exchange of information, such as the Internet, a Local Area Network, wireless network (e.g., a Wi-Fi/802.11 network), NFC, magnetic fields, optical code scanner, infrared, or other suitable connection(s) that enables the sending and receiving of information between the components of system 100. In other embodiments, one or more components of system 100 may communicate directly through a dedicated communication link(s) (shown and not shown).

It is to be understood that the configuration and boundaries of the functional building blocks of system 100 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, wearable device 110, user device 120, third-party server 140, token vault operator server 150, token vault 155, or requestor device 160 may constitute a part of components of system 100 other than those specifically described, or may constitute a part of multiple components of system 100 (i.e., a distributed system). Moreover, token vault operator server 155 and token vault 155 may be separate and distinct from other components of system 100 (as shown), or token vault operator server 155 and token vault 155 may be may be part another component of system 100.

Figure 5:
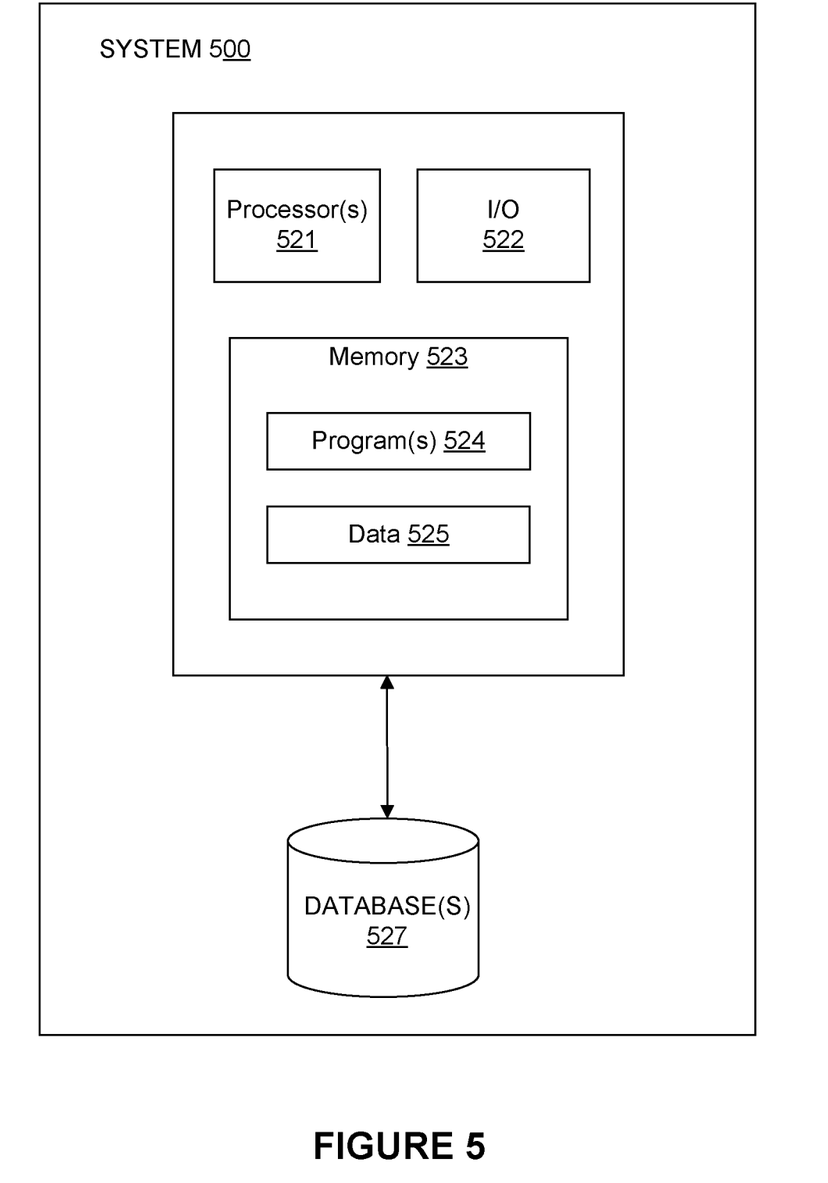
FIG. 5 is another exemplary system, consistent with disclosed embodiments.

FIG. 5 is a diagram of another exemplary system 500, consistent with disclosed embodiments. Variations of exemplary system 500 may be used by user device 120, third-party server 140, token vault operator server 150, token vault 155, or requestor device 160. In one embodiment, system 500 may comprise one or more processors 521, one or more I/O devices 522, and one or more memories 523. In some embodiments, system 500 may take the form of a server, general purpose computer, mainframe computer, or any combination of these components. In some embodiments, system 500 may take the form of a mobile computing device such as a smartphone, tablet, laptop computer, or any combination of these components. Alternatively, system 500 may be configured as a particular apparatus, embedded system, dedicated circuit, or the like based on the storage, execution, and/or implementation of the software instructions that perform one or more operations consistent with the disclosed embodiments.

Processor 521 may include one or more known processing devices, such as mobile device microprocessors or any various other processors. The disclosed embodiments are not limited to any type of processor(s) configured in system 500.

Memory 523 may include one or more storage devices configured to store instructions used by processor 521 to perform functions related to disclosed embodiments. For example, memory 523 may be configured with one or more software instructions, such as program(s) 524 that may perform one or more operations when executed by processor 521. The disclosed embodiments are not limited to separate programs or computers configured to perform dedicated tasks. For example, memory 523 may include a single program 524 that performs the functions of the user device 120, or program 524 may comprise multiple programs. Memory 523 may also store data 525 that is used by one or more programs. In certain embodiments, memory 523 may store software that may be executed by processor(s) 521 to perform one or more processes consistent with disclosed embodiments.

I/O devices 522 may be one or more devices configured to allow data to be received and/or transmitted by system 500. I/O devices 522 may include one or more digital and/or analog devices that allow system 500 to communicate with other machines and devices, such as other components of system 100. I/O devices 522 may also include one or more digital and/or analog devices that allow a user to interact with system 500 such as a touch-sensitive area, keyboard, buttons, or microphones. I/O devices 522 may also include other components known in the art for interacting with a user.

The components of system 500 may be implemented in hardware, software, or a combination of both hardware and software, as will be apparent to those skilled in the art. For example, although one or more components of system 500 may be implemented as computer processing instructions, all or a portion of the functionality of system 500 may be implemented instead in dedicated electronics hardware.

System 500 may also be communicatively connected to one or more database(s) 527. System 500 may be communicatively connected to database(s) 527 through network 170. Database 527 may include one or more memory devices that store information and are accessed and/or managed through system 500. By way of example, database(s) 527 may include Oracle™ databases, Sybase™ databases, or other relational databases or non-relational databases, such as Hadoop sequence files, HBase, or Cassandra. The databases or other files may include, for example, data and information related to the financial records, purchase transaction data, etc. Systems and methods of disclosed embodiments, however, are not limited to separate databases. In one aspect, system 500 may include database 527. Alternatively, database 527 may be located remotely from the system 500. Database 527 may include computing components (e.g., database management system, database server, etc.) configured to receive and process requests for data stored in memory devices of database(s) 527 and to provide data from database 527.

Figure 6:
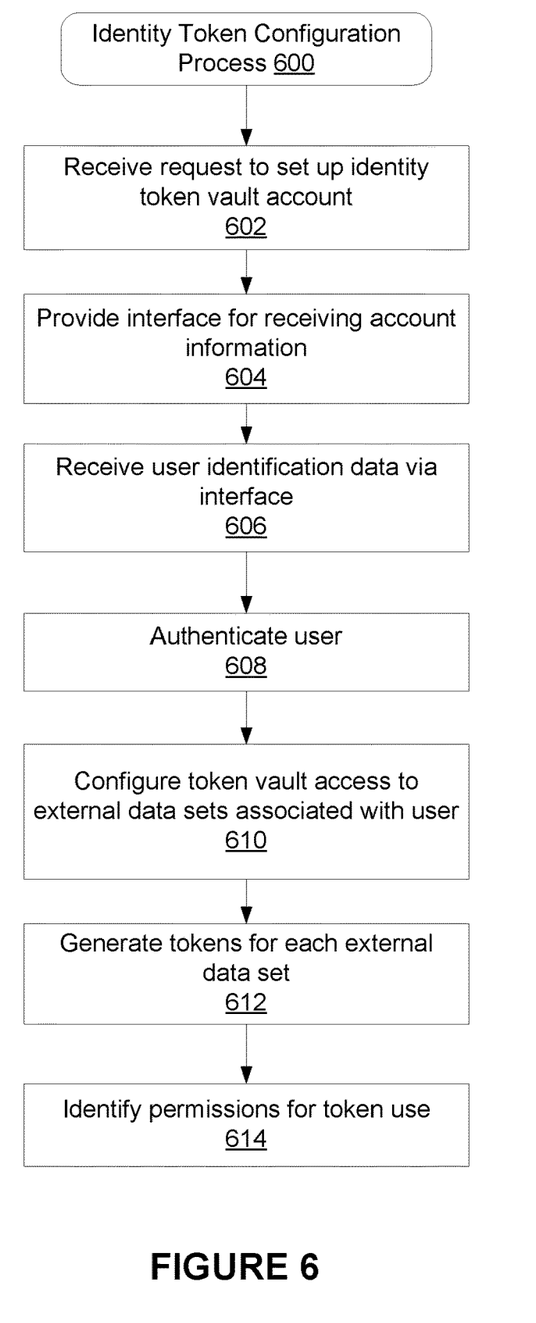
FIG. 6 is a flow chart of an exemplary identity token configuration process, consistent with disclosed embodiments.

FIG. 6 is a flow chart of an exemplary identity token configuration process 600, consistent with disclosed embodiments.

In step 602, token vault operator server 150 may receive a request to set up an identity token account. For example, user 115 may operate user device 120 to access a web site, online portal, API, etc., provided by token vault operator server 150 to configure a token vault account. At step 604, token vault operator server 150 may provide an interface to, for example, client device 120 for receiving account information. Token vault operator server 150 may further receive user identification data via the provided interface (step 606). For example, token vault operator server 150 may receive personal information including name, address, social security number, phone numbers, financial account information, insurance information, medical history information, etc., and/or access credential information for accessing personal data from another source (such as, for example, third-party devices associated with one or more of a medical office, financial service provider, insurance provider, etc.). At step 608, token vault operator server 150 may authenticate user 115. For example, token vault operator server 150 may employ traditional means of confirming the identity of new users, such as comparing entered information to trusted information retrieved from another source, contacting the user 115 directly, etc. After authenticating user 115 and the received customer identification data, token vault operator server 150 may generate a token vault ID/account for user 115 (step not shown).

Token vault operator server 150 may further configure access to token vault 155 data sets associated with user 115. For example, if token vault operator server 150 received a request to create identity token(s) for financial, medical, insurance, loyalty program, and identification token classes, token vault operator server 150 may create a dataset in token vault 155 for each token class associated with user 115's token vault account. Additionally or alternatively, token vault operator server 150 may use access credentials provided by user 115 to access external data sets associated with third-party server 140. For example, token vault operator server 150 may use access credentials to a financial account of user 115 to gain access to external financial data sets. In some embodiments, a data set may be created and/or made accessible by token vault 155 for each account/profile/record of user 115.

At step 612, token vault operator server 150 may generate a token for each data set generated in step 610. Token vault operator server 150 may further identify one or more permissions for token use (step 614). For example, token vault operator server 150 may automatically generate limits on the use of financial accounts such that credit limits are not exceeded, accounts are not overdrawn, etc. Additionally or alternatively, token vault operator server 150 may identify access levels based on the sensitivity or confidentiality of user 115 information. For example, a merchant requesting account information to complete a financial transaction may only receive information associated with a token strictly necessary to complete the transaction. In some embodiments, however, user 115's preferences may allow certain manufacturers to receive a higher access level of information (e.g., demographic, spending patterns, and/or any other information usable target marketing or the like). For example, user 115's preferences may allow a manufacturer to receive higher access level information upon providing a coupon or other asset to user 115. In still another example, token vault operator server 150 may identify a permission requiring token vault operator server 150 to employ additional security measures (e.g., biometric scan, PIN entry, etc.) before providing a requestor (via, e.g., requestor device 160) with account information associated with a token being used to purchase items over a threshold monetary amount.

Figure 7:
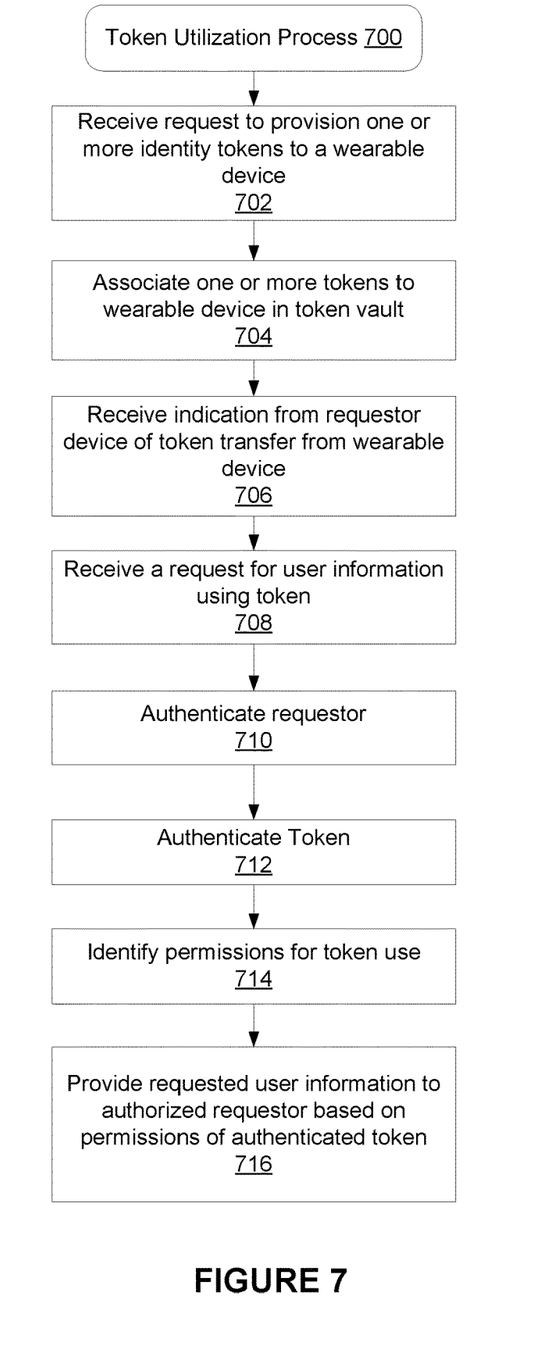
FIG. 7 is a flow chart of an exemplary token utilization process, consistent with disclosed embodiments.

FIG. 7 is a flow chart of an exemplary token utilization process 700, consistent with disclosed embodiments. For ease of discussion, process 700 may be discussed from the perspective of token vault operator server 150 and token vault 155. It should be understood, however, that other components of system 100 (shown and not shown) may execute one or more steps of process 700.

At step 702, token vault operator server 150 may receive a request to provision one or more identity tokens to a wearable device 110. For example, user 115 may request (via, e.g., user device 120) that the identity tokens generated in step 612 become provisioned to wearable device 110. Provisioning may become accomplished, for example, as discussed below with respect to FIG. 8. At step 704, token vault operator server 150 may associate the token(s) provisioned to wearable device 110 in data vault 155.

Consistent with disclosed embodiments, a requestor device 160 may transmit an indication that a token was provided to the requestor system 160 from wearable device 110 (step 706). For example, token vault operator server 150 may receive a request for information associated with the received token, along with an indication of requestor identification (step 708). At step 710, token vault operator server 150 may authenticate the requestor. For example, token vault operator server 150 may determine the requestor is a certified requestor (e.g., a requestor that has pre-registered and/or become certified by token vault operator server 150).

At step 712, token vault operator server 150 may authenticate the token. For example, token vault operator server 150 may identify the token in token vault 155. Token vault operator server 150 may further confirm that the token class associated with the token is compatible with the type of business associated with the requestor. For example, if token vault operator server 150 determines the token received in step 708 belongs to the "medical" token class, but the requestor is a grocery store seeking transaction information associated with the token, then token vault operator server 150 may decline to authenticate the token for the requested use. In another example, token vault operator server 150 may determine whether the received token is currently active and/or suspected of being compromised (e.g., subjected to fraudulent use) as part of authentication in step 712.

Token vault operator server 150 may also identify permissions, including access level permissions, associated with the received token (step 714). At step 716, token vault operator server 150 may provide requestor device 160 with the requested information (in whole or in part) based on the permissions of the authenticated token and/or the access level of the requestor associated with requestor device 160. In circumstances where token permissions indicated in the token vault user profile dictate, token vault operator server 150 may deny the request for information.

Figure 8:
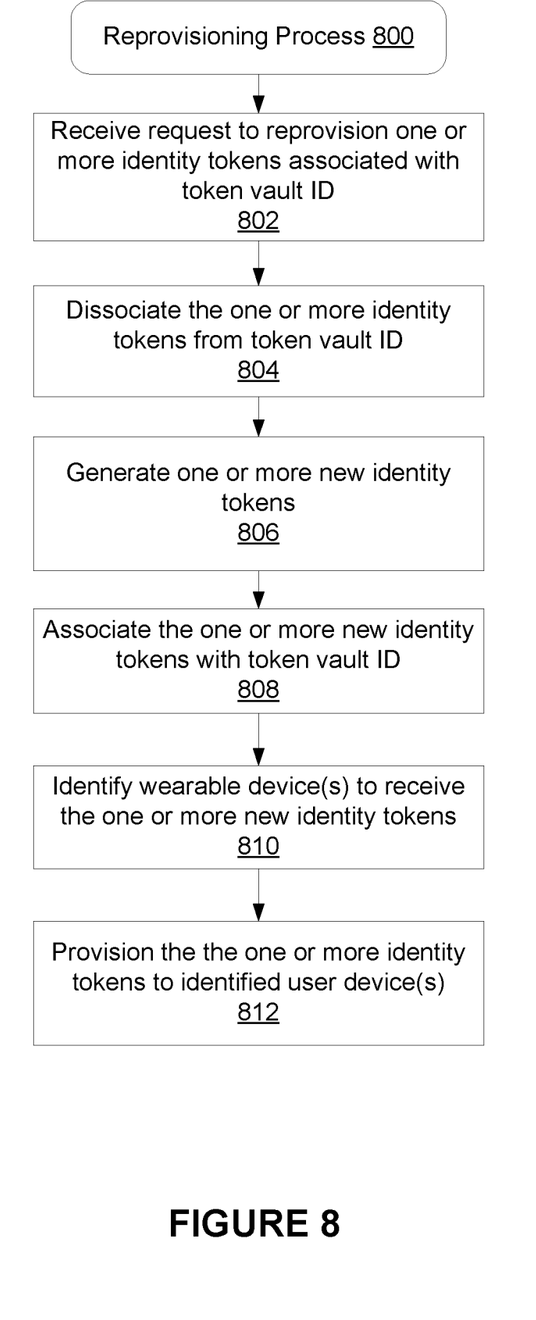
FIG. 8 is a flow chart of an exemplary reprovisioning process, consistent with disclosed embodiments.

FIG. 8 is a flow chart of an exemplary reprovisioning process 800, consistent with disclosed embodiments. Reprovisioning may refer to, for example, replacing a token on secure element 250, setting another slot of secure element as the active slot, and/or replacing a secure element 250 for use in transactions. For ease of discussion, process 800 may be discussed from the perspective of token vault operator server 150 and token vault 155. It should be understood, however, that other components of system 100 (shown and not shown) may execute one or more steps of process 800.

At step 802, token vault operator server 150 may receive a request to reprovision one or more identity tokens associated with a token vault ID. Token vault operator server 150 may also dissociate the one or more identity tokens from the token vault ID (step 804). Thus, according to some embodiments, future requests for information associated with the dissociated token(s) will be denied. Token vault operator server 150 may generate one or more new identity tokens to replace the dissociated token(s) (step 806), and associate the new identity tokens with the token vault ID associated with the request (step 808).

At step 810, token vault operator server 150 may identify one or more wearable device(s) 110 to which the new identity tokens should become provisioned. For example, token vault operator server 150 may access token vault 155 to identify the wearable device(s) 110 associated with the dissociated token. Additionally or alternatively, token vault operator server 150 may receive a request to provision the new identity tokens to one or more wearable device(s) 110 as described above with respect to step 702.

At step 812, token vault operator server 150 may provision the one or more identity tokens to the identified wearable device(s) 110. For example, token vault operator server 150 may determine whether secure element 250 of wearable device 110 includes a plurality of slots, and that at least one slot from the plurality of slots is available (e.g., includes a token not associated with a financial account). If another slot is available on secure element 250, token vault operator server 150 may update token vault 155 to associate the token of the available slot with the token vault ID 451A. In such embodiments, token vault operator server 150 may provide an indication of the active slot for updating the secure element 250. For example, token vault operator server 150 may cause requestor device 160 (e.g., POS terminal or other NFC radio enabled device) and/or user device 120 to display an indication of the new active slot. Wearable device 110 and/or secure element 250 may be manipulated to switch the active slot on the secure element 250. For example, wearable device 110 and/or secure element 250 may include a binary addressing switch panel, multipole toggle switches, and/or other type of physical mechanism for manipulating the active slot of secure element 250. In other embodiments, wearable device 110 may include a vibration sensor capable of recognizing physical gestures of user 115 (e.g., tapping on the wearable device 110). In still other embodiments, wearable device 110 may be configured to receive a magnetic trigger for switching the polarity of components indicating the active slot of wearable device 110.

Regardless of the means for altering the active slot of secure element 250, wearable device 110 may include a display for conveying the current active slot setting of secure element 150. For example, where a secure element comprises four slots, the second of which is the active slot, wearable device 110 may cause LED lights (e.g., one light, two lights, etc.) of a display to light up.

In other embodiments, token vault operator server 150 may provide a new token to wearable device 110 for storage on secure element 250 via requestor device 160. For example, token vault operator server 150 may determine that wearable device 110 may receive NFC radio communications from merchant device 160 and transmit the new token to merchant device 160 via, e.g., network 170, and merchant device 160 may transmit the new token to wearable device 110 via NFC radio for storage on secure element 250.

In still other embodiments, token vault operator server 150 may issue a new secure element 250 for wearable device 110. For example, token vault operator server 150 may determine that wearable device 110 includes a removable secure element 250. After making such a determination, token vault operator server 150 may cause a new secure element 250 storing the new token to become provided to user 115 for installation in wearable device 110.

Figure 9:
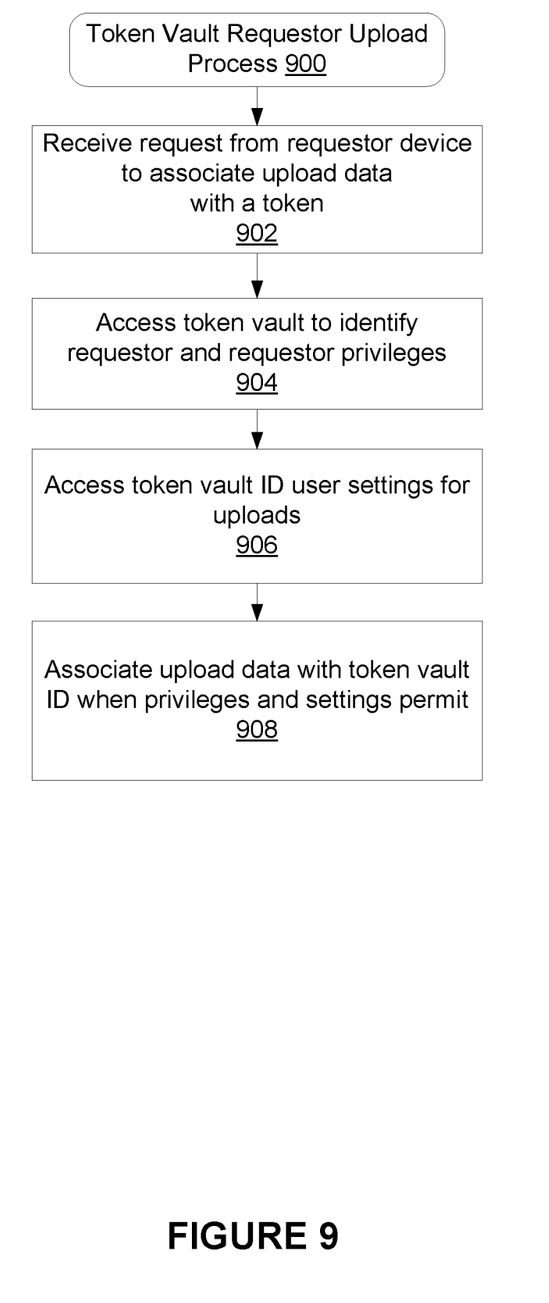
FIG. 9 is a flow chart of an exemplary token vault requestor upload process, consistent with disclosed embodiments.

FIG. 9 is a flow chart of an exemplary token vault requestor upload process 900, consistent with disclosed embodiments. For ease of discussion, process 900 may be discussed from the perspective of token vault operator server 150 and token vault 155. It should be understood, however, that other components of system 100 may execute one or more steps of process 900.

At step 902, token vault operator server 150 may receive a request to associate upload data with a token in token vault 155. For example, a third-party server 140 and/or requestor device 160 associated with a medical facility may request to upload additional medical history information for associated with a token in the "medical" token class. Token vault operator server 150 may identify, at step 904, the identity of the requestor associated with the third-party server 140 and/or requestor device 160, as well as the requestor's privileges. For example, token vault operator server 150 may place fewer restrictions on the ability of medical facilities and/or government entities to upload information to token vault 155 as compared to a merchant, retailer, etc.

At step 906, token vault operator server 150 may access the token vault user profile 451E associated with the token(s) identified in step 902 to identify user restrictions to uploads. For example, user profile 451E may include permissions for a first merchant to upload purchase history and/or loyalty program information, while including restrictions on other merchants preventing the upload of information. At step 908, token vault operator server 150 may update token vault 155 according to the accessed requestor privileges and token vault user profile settings.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored in and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A system, comprising:
a database configured to store a plurality of tokens, each token of the plurality of tokens associated with one or more token vault IDs;
at least one network communication device;
a storage device comprising instructions; and
at least one processor configured to execute the instructions to perform operations comprising:
receiving a request to establish a token vault account for a user, the request comprising at least one of customer identification information, medical history information, or an access credential to an external data set;
authenticating an identity of the user based at least on the received request;
generating a token vault ID associated with the user;
configuring access to one or more data sets generated for and associated with the token vault ID, the one or more data sets being stored in the database or at least one external storage database;
generating a plurality of tokens associated with the token vault ID, each token of the plurality of tokens associated with the token vault ID corresponding to one of the one or more data sets;
providing the generated plurality of tokens associated with the token vault ID to at least one user device;
receiving, by a requestor device, a token and a request for information associated with the received token;
determining that a token class of the received token matches an entity type associated with the requestor device; and
providing the requested information to the requestor device based in part on the determined match.

2. The system of claim 1, the operations further comprising:
identifying a first token from among the generated plurality of tokens based on the received token; and
accessing one or more permissions associated with the identified first token, wherein the requested information is further provided to the requestor device based on the accessed one or more permissions.

3. The system of claim 1, wherein the received token corresponds to a token passed to the requestor device by NFC radio from the at least one user device.

4. The system of claim 1, wherein receiving the request comprises receiving the request from the user device.

5. The system of claim 1, the operations further comprising configuring one or more token classes associated with the token vault ID.

6. The system of claim 5, wherein the one or more data sets comprise a data set for each of the one or more token classes.

7. The system of claim 1, the operations further comprising:
receiving a request to reprovision a first token in the generated plurality of tokens, the first token corresponding to a first data set in the one or more data sets;
dissociating the first token from the token vault ID;
generating a new token associated with the token vault ID, the new token corresponding to the first data set; and
providing the generated new token associated with the token vault ID to the least one user device.

8. A method, comprising:
receiving a request to establish a token vault account for a user, the request comprising at least one of customer identification information, medical history information, or an access credential to an external data set;
authenticating an identity of the user based at least on the received request;
generating a token vault ID associated with the user;
configuring access to one or more data sets generated for and associated with the token vault ID, the one or more data sets being stored in a database;
generating a plurality of tokens associated with the token vault ID, each token of the plurality of tokens associated with the token vault ID corresponding to one of the one or more data sets;
providing the generated plurality of tokens associated with the token vault ID to at least one user device;
receiving, by a requestor device, a token and a request for information associated with the received token;
determining that a token class of the received token matches an entity type associated with the requestor device; and
providing the requested information to the requestor device based in part on the determined match.

9. The method of claim 8, further comprising:
identifying a first token from among the generated plurality of tokens based on the received token; and
accessing one or more permissions associated with the identified first token, wherein the requested information is further provided to the requestor device based on the accessed one or more permissions.

10. The method of claim 8, wherein the received token corresponds to a token passed to the requestor device by NFC radio from the at least one user device.

11. The method of claim 8, wherein receiving the request comprises receiving the request from the user device.

12. The method of claim 8, further comprising configuring one or more token classes associated with the token vault ID.

13. The method of claim 12, wherein the one or more data sets comprise a data set for each of the one or more token classes.

14. The method of claim 8, the method further comprising:
receiving a request to reprovision a first token in the generated plurality of tokens, the first token corresponding to a first data set in the one or more data sets;
dissociating the first token from the token vault ID;
generating a new token associated with the token vault ID, the new token corresponding to the first data set; and
providing the generated new token associated with the token vault ID to the least one user device.

15. A non-transitory computer readable medium storing instructions that, when executed by one or more processors, cause the one or more processors to perform operations comprising:
receiving a request to establish a token vault account for a user, the request comprising at least one of customer identification information, medical history information, or an access credential to an external data set;
authenticating an identity of the user based at least on the received request;
generating a token vault ID associated with the user;
configuring access to one or more data sets generated for and associated with the token vault ID, the one or more data sets being stored in a database;
generating a plurality of tokens associated with the token vault ID, each token of the plurality of tokens associated with the token vault ID corresponding to one of the one or more data sets;
providing the generated plurality of tokens associated with the token vault ID to at least one user device;
receiving, by a requestor device, a token and a request for information associated with the received token;
determining that a token class of the received token matches an entity type associated with the requestor device; and
providing the requested information to the requestor device based in part on the determined match.

16. The non-transitory computer readable medium of claim 15, further comprising:
identifying a first token from among the generated plurality of tokens based on the received token; and
accessing one or more permissions associated with the identified first token, wherein the requested information is further provided to the requestor device based on the accessed one or more permissions.

17. The non-transitory computer readable medium of claim 15, wherein the received token corresponds to a token passed to the requestor device by NFC radio from the at least one user device.

18. The non-transitory computer readable medium of claim 15, further comprising configuring one or more token classes associated with the token vault ID.

19. The non-transitory computer readable medium of claim 18, wherein the one or more data sets comprise a data set for each of the one or more token classes.

20. The non-transitory computer readable medium of claim 15, the method further comprising:
receiving a request to reprovision a first token in the generated plurality of tokens, the first token corresponding to a first data set in the one or more data sets;
dissociating the first token from the token vault ID;
generating a new token associated with the token vault ID, the new token corresponding to the first data set; and
providing the generated new token associated with the token vault ID to the least one user device.

* * * * *

UNITED STATES PATENT AND TRADEMARK OFFICE
CERTIFICATE OF CORRECTION

PATENT NO. : 10,410,208 B2
APPLICATION NO. : 15/136492
DATED : September 10, 2019
INVENTOR(S) : Lawrence Douglas et al.

Page 1 of 1

It is certified that error appears in the above-identified patent and that said Letters Patent is hereby corrected as shown below:

In the Claims

In Claim 7, at Column 17, Line 10 "ID to the least," should read --ID to the at least--.

In Claim 14, at Column 18, Line 2 "ID to the least," should read --ID to the at least--.

In Claim 20, at Column 18, Line 59 "ID to the least," should read --ID to the at least--.

Signed and Sealed this
Eighteenth Day of February, 2020

Andrei Iancu
*Director of the United States Patent and Trademark Office*